United States Patent [19]
Olson

[11] Patent Number: 5,500,833
[45] Date of Patent: Mar. 19, 1996

[54] BEAM POSITION INDICATOR FOR DIRECTIONAL RADAR

[75] Inventor: Robert J. Olson, Peoria, Ariz.

[73] Assignee: Honeywell Inc., Minneapolis, Minn.

[21] Appl. No.: 160,985

[22] Filed: Dec. 1, 1993

[51] Int. Cl.$^6$ .................................................. G01S 13/08
[52] U.S. Cl. .................................................. 342/182
[58] Field of Search .................................. 342/176, 180, 342/182; 348/116

[56] References Cited

U.S. PATENT DOCUMENTS 4,325,066 4/1982 Grettenberg ........................... 342/61

4,940,987 7/1990 Frederick ............................ 342/180

*Primary Examiner*—Daniel T. Pihulic
*Attorney, Agent, or Firm*—Charles J. Ungemach

[57] ABSTRACT

A radar display having particular utility in search and rescue radar systems, employs a computer receiving inputs indicative of aircraft altitude, radar beam tilt angle and radar beam bandwidths to provide signals to the display indicative of where the radar beam intersects the surface under investigation.

8 Claims, 1 Drawing Sheet

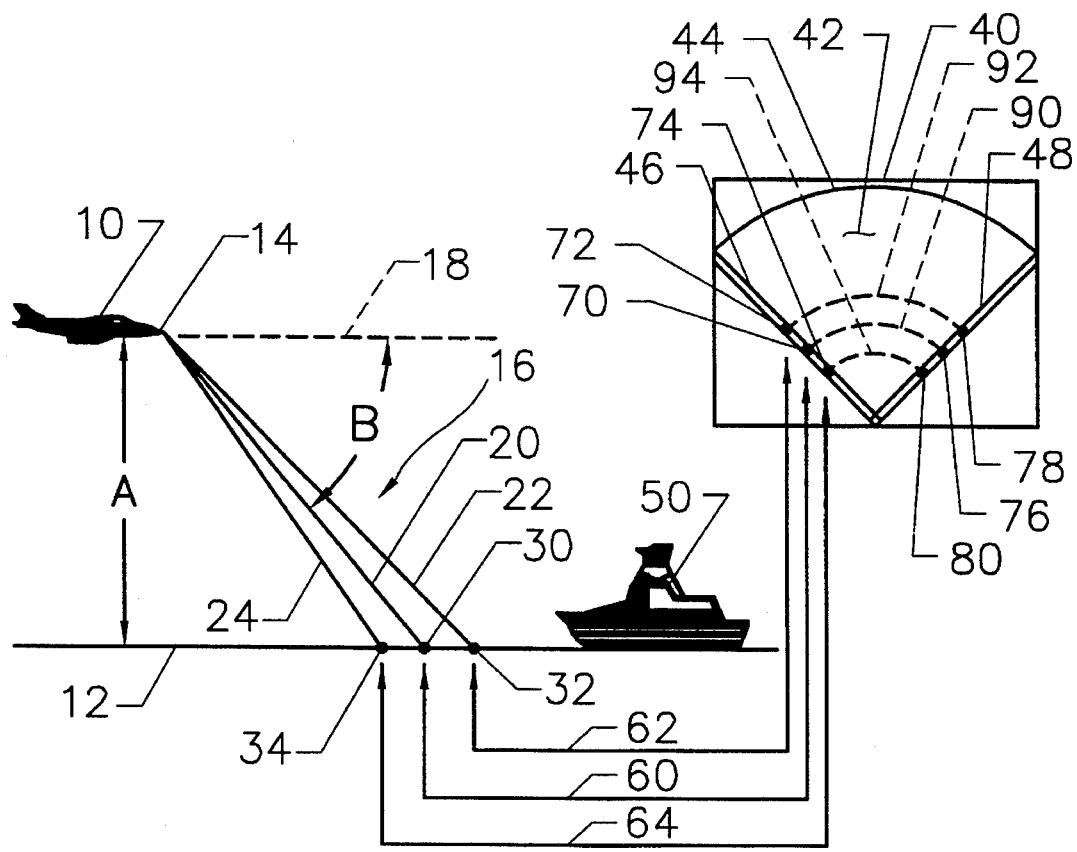
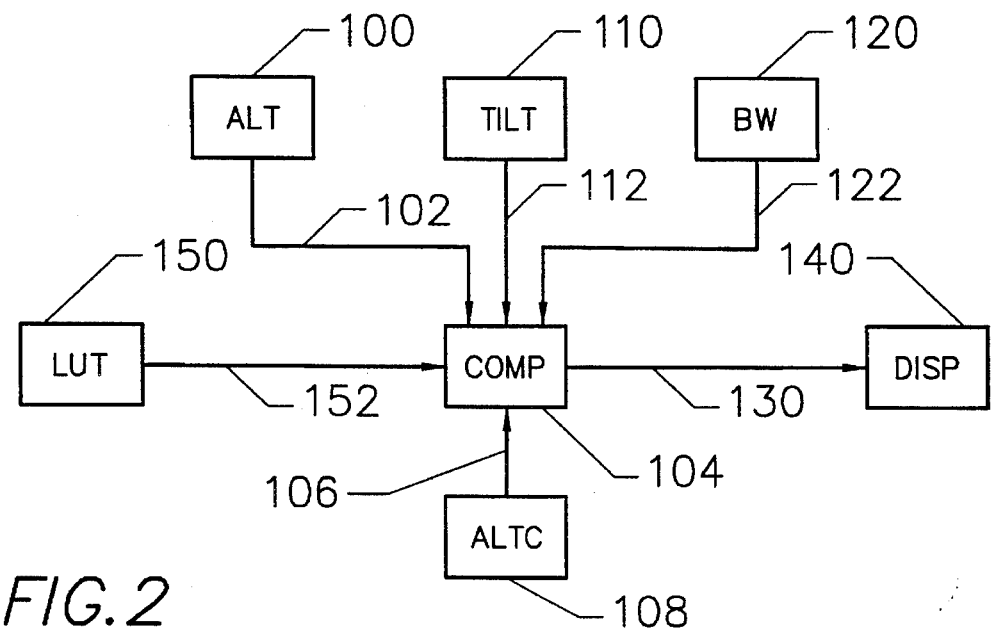
FIG.1
FIG.2

BEAM POSITION INDICATOR FOR DIRECTIONAL RADAR

BACKGROUND OF THE INVENTION

1. Field of the Invention

This invention relates generally to radar displays and, more particularly, to a radar display wherein it is desired to know the position that a directable radar antenna's beam strikes the surface being detected. The invention finds particular utility in search and rescue radar systems over waterways such as oceans.

2. Description of the Prior Art

Search and radar systems presently employed utilize an antenna which is directable by the pilot at tilt angles from the direction of the travel of the craft to intersect the surface being searched. In most cases, reflections from objects on the surface back to the receiver in the aircraft produce, on the radar display or "scope," a blip indicating where the beam is directed.

In search and rescue missions over terrain that has no significant ground return, such as in search missions over the ocean, the pilot has had to estimate or guess where, on his display, the radar beam is intersecting the water. This estimation may be off by a considerable margin, thus making it difficult for the pilot to properly direct his antenna for detecting lost objects.

SUMMARY OF THE INVENTION

The present invention overcomes the problem in the prior art by utilizing the known altitude of the aircraft, the tilt angle of the radar antenna and the beam width of the radar beam to input a computer which can then calculate from these variables the position of the intersection, not only of the centerline of the beam but also the edges of the beam width which is generally considered to be the point where the beam power is one-half of its maximum value (the 3 dB point) on both sides of the center.

BRIEF DESCRIPTION OF THE DRAWINGS

FIG. 1 is a representation of an aircraft and its radar display on a search and rescue mission over a flat surface; and FIG. 2 is a block diagram of one embodiment of the present invention.

DESCRIPTION OF THE PREFERRED EMBODIMENTS

FIG. 1 shows an aircraft 10 flying at an altitude A above a flat surface 12, such as an ocean. A radar antenna 14 located on the craft 10 directs a beam 16 of radar energy downward toward the surface 12 at a tilt angle B between horizontal, shown by dashed line 18, and the centerline 20 of the radar beam 16. Beam 16 also shows lines 22 and 24 which define the beam width which is normally dependent on antenna size.

The lines 20, 22 and 24 of radar beam 16 are shown striking the surface 12 at points 30, 32 and 34, respectively. Since the surface 12 is very flat, little or no reflections will occur back toward the aircraft 10.

Also shown in FIG. 1 is a radar display or scope 40 showing the field of the radar scan 42 over the surface 12. In normal practice the scan will be conducted at the tilt angle B in a semicircular search arch 44 between limits 46 and 48.

Since little or no reflections are being received by the radar in aircraft 10, there is no indication on the display 40 where the radar beam 16 is located with respect to surface 12. Accordingly, it would be difficult for the pilot to accurately direct the antenna by altering the tilt angle B so as to detect an object such as boat 50 in FIG. 1.

As will be explained in connection with FIG. 2, the present invention operates to determine, by means of a computer, where the points 30, 32 and 34 strike the surface 12, and to present this information to the display 40, as shown schematically by arrows 60, 62 and 64, respectively. These signals operate to produce small blips, such as 70, 72 and 74, on the left-hand extremity of the scan field 42 and, if desired, by small blips 76, 78 and 80 on the right-hand extremity of the field 42. Having these reference points showing the position of the radar beam's intersection with the surface 12 on the edges 46 and 48, it becomes a simple matter for the pilot to visually extrapolate across the field 42 to see where the scan is covering. The scan is shown by dashed lines 90, 92 and 94 in FIG. 1. If desired for greater accuracy, the scan lines 90, 92 and 94 may also be illuminated on the scan field 42.

Referring now to FIG. 2, a block diagram showing the apparatus necessary for calculating the position of points such as 70, 72 and 74 on the display 40 is shown. In FIG. 2, the aircraft altimeter 100 is shown producing an output along a line 102 to a computer 104 on the aircraft. The altimeter may be a radar altimeter operable to show the altitude A above the surface 12 or it may be a barometric altimeter to show the altitude A above sea level when such is the case for surface 12. For surfaces other than sea level, a correction factor may be applied to computer 104 as, for example by line 106 to computer 104 from an Altitude Correction box 108. The altimeter 100 and the computer 104 may be already existing components on the aircraft.

In FIG. 2, a tilt box 110 is shown producing an output on line 112 to computer 104. As mentioned above, the aircraft pilot normally can manually set the tilt angle B in FIG. 1, and the tilt box 110 in FIG. 2 is a sensor which senses the angle B and feeds this information via line 112 to the computer 104.

Also shown in FIG. 2 is a beam width box 120 producing an output such as shown by line 122 to the computer 104. Beam width box 120 is normally a signal which is determined by the physical size of the antenna 14 on aircraft 10 and will not be a variable which changes during flight. Accordingly, this signal may be permanently entered into computer 104 when the aircraft antenna size is known. In any event, the signal on line 122 gives the beam width which is normally that area between the 3dB points shown by lines 22 and 24 in FIG. 1.

FIG. 2 shows the computer 104 producing an output 130 to the display 140 which may be the same as display 40 in FIG. 1. Line 130 will normally be a serial control bus which feeds the information to display 140 in serial fashion. The computer determines the position of point 30 on surface 12 in FIG. 10 from the equation $$R = A/\text{Tan}(B) \tag{1}$$

where R is the range from a point directly under aircraft 10 to the point 30. The signal for determining the position of point 32 is computed by the computer 104 in accordance with the equation $$R = A/\text{Tan}(B - \tfrac{1}{2}C) \tag{2}$$

where C is the beam width of the beam 16 in FIG. 1. The information for the position of point 34 is determined by the computer 104 from the equation $$R = A/\text{Tan}(B + \tfrac{1}{2}C) \qquad (3)$$

In the above equations, the curvature of the earth's surface 12 and the effects of such things as refraction of the radar beam by the atmosphere have been ignored since they produce very little change in the calculations. If these factors were desired to be taken into account, then an input such as lookup table 150 having an output along a line 152, could be used to provide signals to compensate for these factors.

It is, therefore, seen that I have provided a system which greatly improves the pilot's perception of where his radar beam is and eliminates much of the guesswork when he is flying over surfaces such as water. The present invention provides an indication on the display of where to set the antenna tilt so that the radar beam can illuminate the object of interest such as boat 50 in FIG. 1. Many changes to the disclosures used in connection with the preferred embodiment will occur to those having ordinary skill in the art, and I do not intend to be limited by these specific disclosures. I intend only to be limited by the following claims:

I claim:

1. Apparatus for displaying to an aircraft pilot the intersection of a radar beam with the surface over which the aircraft is flying comprising:

means producing signals indicative of the altitude of the aircraft over the surface the beam width of the radar and the tilt angle of the radar beam;

computer means connected to receive the signals, to compute the intersection of the center and the two beam width points and to produce an output indicative thereof, and display means connected to receive the output and display the three points.

2. Apparatus according to claim 1 wherein the computer means determines the intersection of the center according to the equation $R = A/\text{Tan } B$, a first of the two beam points by the equation $R1 = A/\text{Tan}(B - 0.5C)$ and a second of the two beam points by the equation $R2 = A/\text{Tan}(B + 0.5C)$, where R is the range of the center, R1 is the range of the first beam point, R2 is the range of the second beam point, B is the tilt angle and C is the beam width.

3. Apparatus according to claim 1 wherein the computer means receives further inputs indicative of earth curvature and refraction of the radar beam by the atmosphere.

4. Apparatus according to claim 1 wherein the altimeter is a barometric altimeter and the computer means receives a further input to convert to local altitude.

5. In a ground search, radar for use on an aircraft flying over a surface and having an altimeter, a radar antenna of predetermined beam width and being directable in tilt angle by the pilot, a computer and a radar scope, the improvement comprising:

means providing the computer with a signal from the altimeter indicative of altitude;

means providing the computer with a signal from the antenna indicative of tilt angle;

means providing the computer with a signal indicative of the beam width of the antenna, said computer determining the intersection points of the center of the radar beam and the two beam width points of the beam with the surface and producing an output indicative thereof; and means connecting the output to the scope to provide a display of the intersection points.

6. Apparatus according to claim 5 wherein the computer determines the intersection point of the center according to the equation $R = A/\text{Tan } B$, a first of the two beam points is determined by the equation $R1 = A/\text{Tan}(B - 0.5C)$ and a second of the two beam points is determined by the equation $R2 = A/\text{Tan}(B + 0.5C)$, where R is the range of the center, R1 is the range of the first beam point, R2 is the range of the second beam point, B is the tilt angle and C is the beam width.

7. Apparatus according to claim 6 where the surface is sea water and the altitude is altitude above sea level.

8. Apparatus according to claim 6 wherein the radar scope scans between fight and left extremities and the indication of the intersection points is a set of marks positioned at the left and right extremities.

\* \* \* \* \*

UNITED STATES PATENT AND TRADEMARK OFFICE
CERTIFICATE OF CORRECTION

PATENT NO. : 5,500,833
DATED : March 19, 1996
INVENTOR(S) : Robert J. Olson

It is certified that error appears in the above-indentified patent and that said Letters Patent is hereby corrected as shown below:

Column 3, line 29, after "surface" insert --,--.

Column 4, line 38 cancel "fight" and substitute --right--.

Signed and Sealed this

Twenty-third Day of July, 1996

Attest:

BRUCE LEHMAN

Attesting Officer

Commissioner of Patents and Trademarks